(12) United States Patent
Lutz et al.

(10) Patent No.: US 8,523,687 B2
(45) Date of Patent: Sep. 3, 2013

(54) CONSTANT VELOCITY BALL JOINT

(75) Inventors: Mathias Lutz, Tuebingen (DE);
Thomas Gregor, Remlingen (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/182,545

(22) Filed: Jul. 14, 2011

(65) Prior Publication Data

US 2012/0015751 A1 Jan. 19, 2012

Related U.S. Application Data

(60) Provisional application No. 61/368,107, filed on Jul. 27, 2010.

(30) Foreign Application Priority Data

Jul. 14, 2010 (DE) .......................... 10 2010 027 059
Jul. 29, 2010 (DE) .......................... 10 2010 032 419

(51) Int. Cl.
*F16D 3/223* (2011.01)

(52) U.S. Cl.
USPC ......................................... 464/145; 464/906

(58) Field of Classification Search
USPC .................................... 464/15, 140–146, 906
See application file for complete search history.

(56) References Cited

U.S. PATENT DOCUMENTS

| 2,579,356 | A | * | 12/1951 | Anderson | 464/144 |
|---|---|---|---|---|---|
| 5,122,096 | A | | 6/1992 | Aucktor et al. | |
| 5,531,643 | A | | 7/1996 | Welschof | |
| 6,872,143 | B2 | | 3/2005 | Weckerling et al. | |
| 7,591,730 | B2 | | 9/2009 | Schwaerzler et al. | |

FOREIGN PATENT DOCUMENTS

| DE | 39 39 531 C1 | 6/1991 |
|---|---|---|
| DE | 42 22 205 A1 | 1/1994 |
| DE | 10 2004 018 721 A1 | 4/2005 |
| DE | 202 21 755 U1 | 6/2007 |
| DE | 10 2004 018 721 B4 | 6/2010 |

* cited by examiner

*Primary Examiner* — Gregory Binda
(74) *Attorney, Agent, or Firm* — Crowell & Moring LLP

(57) ABSTRACT

A joint, particularly a constant velocity ball joint, including an inner hub and an outer hub, which hubs exhibit respective inner and outer ball tracks which are associated with each other in pairs, and further including balls disposed in the pairs of associated inner and outer ball tracks, the tracks being configured such that at the contact points of the balls with the ball tracks the tangential planes form an angle of inclination, and the ball tracks exhibiting at any given time a continually changing curvature, as a result of which the angle of inclination is constant.

7 Claims, 4 Drawing Sheets

Joint Bend Angle

Prior Art

CONSTANT VELOCITY BALL JOINT

CROSS REFERENCE TO RELATED APPLICATIONS

This application claims priority from U.S. provisional patent application no. 61/368,107, filed Jul. 27, 2010, and also from Federal Republic of Germany patent application nos. DE 10 2010 027 059, filed Jul. 14, 2010, and DE 10 2010 032 419, filed Jul. 29, 2010, the entire disclosures of each of which are incorporated herein by reference.

BACKGROUND OF THE INVENTION

The invention relates to a joint comprising an inner hub, which has a longitudinal axis and inner ball tracks, and comprising an outer hub, which has a longitudinal axis and outer ball tracks, wherein the inner ball tracks and the outer ball tracks are associated with each other in pairs, and comprising a cage, which has apertures, distributed around the periphery, and which is disposed between the inner hub and the outer hub, and comprising balls, which are disposed in the apertures of the cage and in the pairs of inner ball tracks and outer ball tracks and which are held in a plane by the cage, wherein the tangential planes form an angle of inclination at the contact points of the balls with the inner ball tracks and the outer ball tracks, in which each of the inner ball tracks has an active section, in which the balls move, and in which each of the outer ball tracks has an active section, in which the balls move. The joint concerns, for example, a fixed-type universal joint or more specifically a counter track joint with alternating tracks. However, the invention is also applicable to other constant velocity ball joints.

In the prior art the ball tracks in the inner and outer hubs are generally constructed from sectors. A wide range of joints and configurations of ball tracks may be found, for example, in U.S. Pat. No. 7,591,730 (=DE 10 2004 018 721); U.S. Pat. No. 5,531,643 (=DE 42 22 205); U.S. Pat. No. 5,122,096 (=DE 39 39 531) or U.S. Pat. No. 6,872,143 (=DE 202 21 755 U1), the entire disclosures of which are incorporated herein by reference. The configuration of the joint with respect to the angle of inclination depends on a number of criteria. In order to control the balls, there should always be an angle of inclination that is greater than the self-locking angle. Furthermore, the angle of inclination should be as small as possible in order to avoid a degradation of the efficiency, a decline that is typically associated with higher pressure at the contact points. Therefore, on the one hand, the angle of inclination should be as large as possible, but, on the other hand, as small as possible. However, the increase in efficiency is especially relevant for the current efforts to reduce the emission of $CO_2$ and to reduce the fuel requirement.

SUMMARY OF THE INVENTION

The object of the invention is to provide a joint with an improved efficiency. This and other objects have been achieved in accordance with the present invention by providing a joint in which at least the active sections of the inner ball tracks exhibit a curvature that will be in essence continually changing along the associated longitudinal axis, at least the active sections of the outer ball tracks exhibit a curvature that will be in essence continually changing along the associated longitudinal axis, and the curvature of the active sections of the inner ball tracks and the curvature of the active sections of the outer ball tracks are configured and adapted to each other in such a way that the angle of inclination is essentially constant at least between the states of the totally extended joint and the maximally bent joint. Therefore, the curvature of the tracks changes at any given time along the longitudinal axis of the respective hub.

The invention is based on the knowledge that the ball tracks known from the prior art exhibit an angle of inclination that changes as the joint bends. Furthermore, tests have demonstrated that under bending load during rotation of the joint, the angle of inclination assumes values that are both larger and smaller than the base angle of inclination. Therefore, the track curves of a constant velocity ball joint according to the invention are configured in such a way that on bending the joint, the angle of inclination remains constant. The track curves are, in particular, not circular and do not consist of discrete circular elements, but rather they have a continually changing curvature. Therefore, the continually constant angle of inclination is equal to the base angle of inclination. Under bending load the constant angle of inclination makes it possible to select a very small base angle of inclination, because there is no risk of falling below the self-locking angle. This approach offers the advantage that the resulting forces of inclination remain low and, thus, the degradation of the efficiency and the pressure at the contact points are negligible. Furthermore, it is possible to obtain smaller radial movements of the balls when the joint bends. These smaller radial lifts make possible ball cages with thin walls so that greater track depths or larger balls can be selected in the inner hub or the outer hub.

One embodiment provides that the inner ball tracks each substantially completely have a substantially continuously changing curvature along the associated longitudinal axis. The constant curvature also relates, for example, to areas, in which the balls are disposed only during the assembly of the joint.

One embodiment includes that the outer ball tracks each have in essence completely a curvature that will be in essence continually changing along the associated longitudinal axis. In this case, too, the same applies to the outer ball tracks which have curvatures that continually change over their entire course.

One embodiment provides that at least the active sections of the inner ball tracks extend in a plane with the associated longitudinal axis. Thus, the course of the active ball tracks does not have a lateral offset, as described, for example, in U.S. Pat. No. 5,531,643. One embodiment includes that the inner ball tracks extend in essence completely in a plane with the associated longitudinal axis.

One embodiment provides that at least the active sections of the outer ball tracks extend in a plane with the associated longitudinal axis. In this embodiment the outer ball tracks are in alignment with the longitudinal axis of the outer hub. One embodiment includes outer ball tracks which extend substantially completely in a plane with the associated longitudinal axis.

One embodiment provides that the curvature of the active sections of the inner ball tracks and the curvature of the active sections of the outer ball tracks respond to the same mathematical function. In this embodiment the ball tracks of the respective pairs of ball tracks are uniform.

One embodiment includes that the curvature of at least the active sections of the inner ball tracks and/or the curvature of at least the active sections of the outer ball tracks can be described at least approximately by a mathematical function that is linear at least piece by piece.

One embodiment provides that the curvature of at least the active sections of the inner ball tracks and/or the curvature of at least the active sections of the outer ball tracks can be described at least approximately by a mathematical function that is elliptical at least piece by piece.

BRIEF DESCRIPTION OF THE DRAWINGS

The invention will be explained in further detail hereinafter with reference to illustrative embodiments shown in the accompanying drawing figures, in which.

DETAILED DESCRIPTION OF ILLUSTRATIVE EMBODIMENTS

Figure 1A:
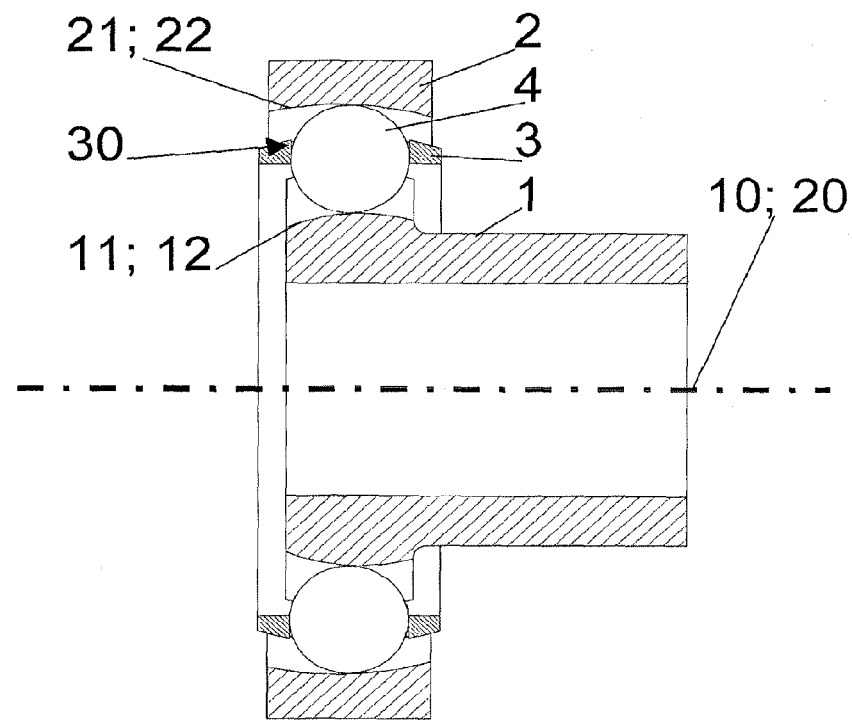
FIGS. 1a and 1b are a sectional view and an end view, respectively, of a schematic joint in the unbent state.
Figure 1B:
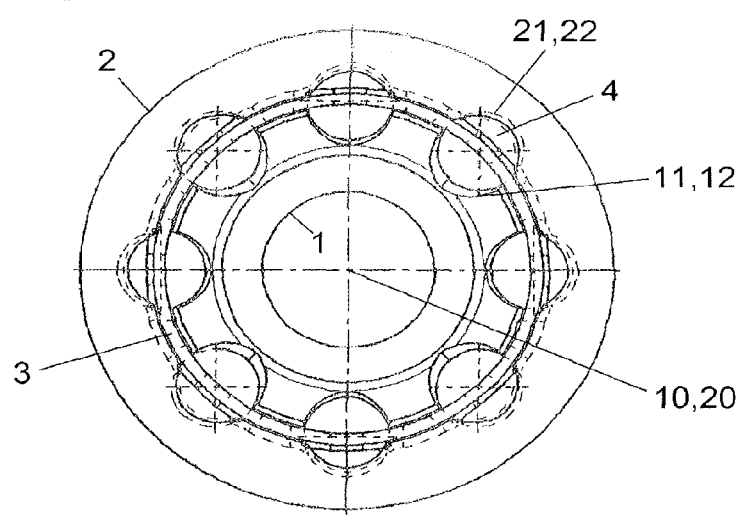

FIGS. 1a and 1b are a sectional view and an end view, respectively, of a joint. Between the inner hub 1 and the outer hub 2 there are balls 4 for transmitting the torque between the two hubs 1, 2. For the balls 4 the inner hub 1 has inner ball tracks 11, and the outer hub 2 has outer ball tracks 21, which accommodate a ball 4 in pairs. The balls 4 are disposed in an aperture 30 of the cage 3, which is disposed between the inner hub 1 and the outer hub 2 and which holds the balls 4 in a plane. In the variant shown herein the active sections 22 of the outer ball tracks 21 coincide with the outer ball tracks 21, and/or the active sections 12 of the inner ball tracks 11 coincide with the inner ball tracks 11. The joint is depicted in the fully extended—that is, unbent—state, in which the longitudinal axes of the outer hub 20 and the inner hub 10 coincide. Thus, this is also the longitudinal axis of the joint. In this respect it is possible, depending on the embodiment, that the cage 3 is centered on the inner hub 1, on the outer hub 2 or both on the inner 1 and on the outer hub 2.

Figure 2:
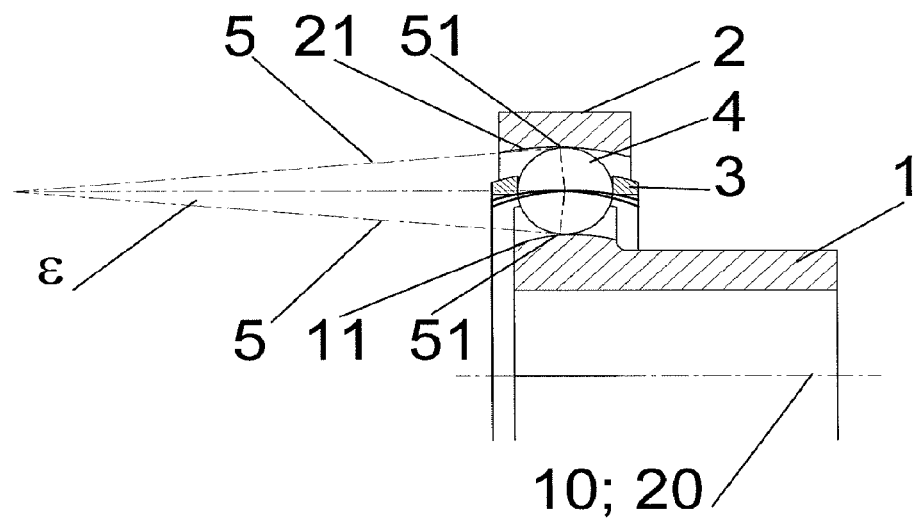
FIG. 2 is a detail view of the joint of FIG. 1.

The detail in FIG. 2 shows the tangential planes 5 at the contact points 51 of the balls 4 with the inner 11 and the outer ball tracks 21. They form the angle of inclination ϵ. The angle of inclination generates an inner axial force at the cage 3. Bending has the effect of producing a movement in the joint, which in turn results in friction, losses, wear and heat. In this respect it holds that under bending load the friction increases and, vice versa, that at a smaller angle of inclination, the friction decreases. However, at the same time it is not possible to reduce the angle of inclination to any size, because at angles of inclination of about 4°, the joint is jammed by self-locking. It holds in conformity with the prior art that the angle of inclination is equal to half the wedge angle of the joint.

Figure 3:
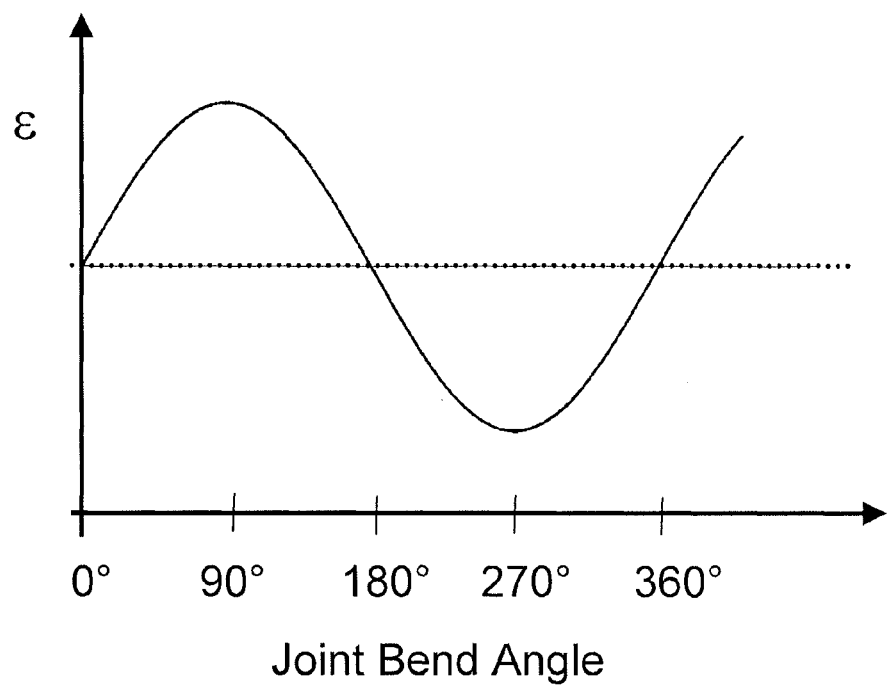
FIG. 3 is a graph of the correlation between the angle of inclination of a joint known from the prior art in the bent state during rotation.

As FIG. 3 shows, the angle of inclination ϵ (Y axis) changes in the joints known from the prior art as a function of the bend angle of the joint (X axis). In this case the respective angles oscillate about the joint's base angle of inclination, as a result of the configuration of the geometry of the joint and its components (cf., for example, U.S. Pat. No. 6,872,143). Since the angle of inclination ϵ should, as a rule, be larger than the self-locking angle, this behavior of the angle in the joints of the prior art necessitates a relatively large base angle of inclination. However, the base angle of inclination should be as small as possible in order to ensure that the efficiency of the joint is as good as possible. For this purpose the angle of inclination ϵ of the joint according to the invention is identical under every bending load.

Figure 4:
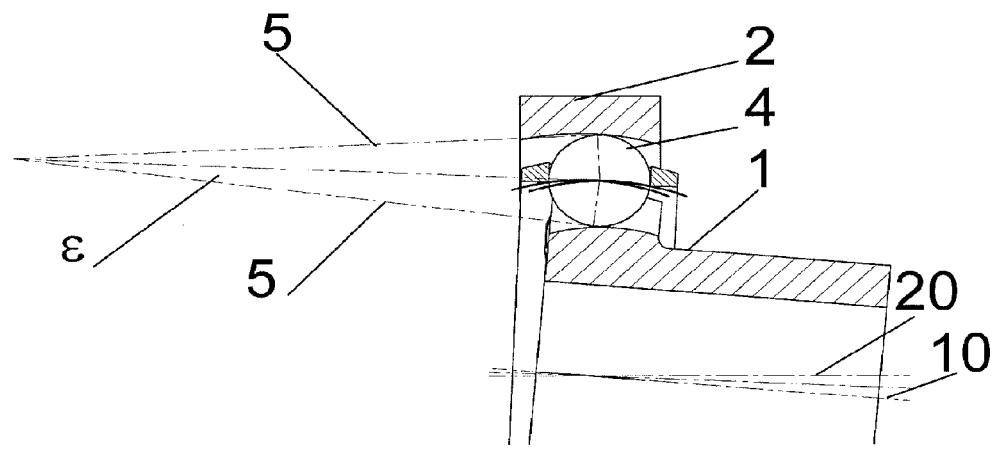
FIGS. 4 and 5 are exploded detail views of the joint of FIG. 1 at various bend angles.
Figure 5:
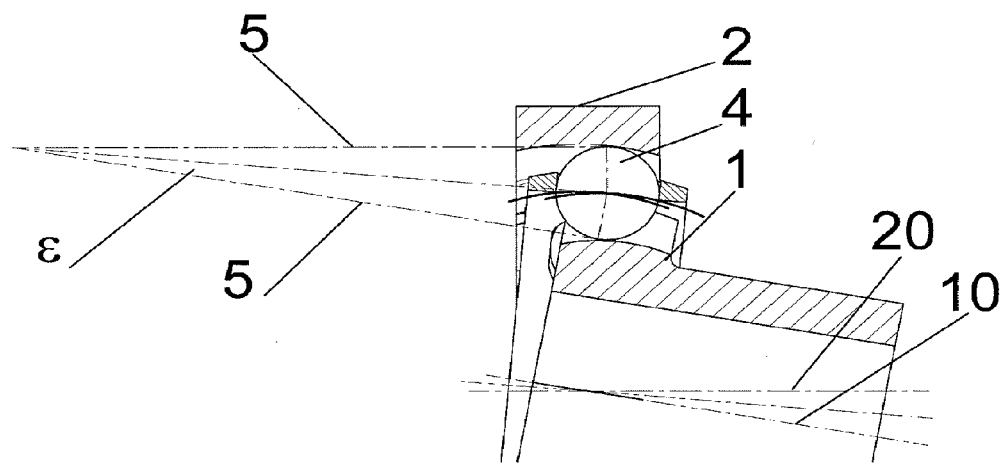

FIGS. 4 and 5 show the joint from FIG. 2 under two different bending loads. That is, the outer hub 2 and the inner hub 1 are tilted relative to each other. In each case the angle of inclination ϵ is the same, independently of the bend angle of the joint. This feature can be achieved, for example, in that the ball tracks comply with an elliptical function.

In one variant the ball tracks are configured without a relief cut. The cage can be centered, in particular, only over the inner hub or only over the outer hub or over the inner and outer hubs. For this purpose corresponding centering surfaces are provided, if desired, on the inside and/or outside of the cage or on the inner and/or on the outer hub.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A joint comprising:
   an inner hub having a longitudinal axis and inner ball tracks,
   an outer hub having a longitudinal axis and outer ball tracks, said outer ball tracks being associated in pairs with respective inner ball tracks of the inner hub;
   a cage disposed between the inner hub and the outer hub and having apertures distributed around its periphery, and
   balls disposed in the apertures of the cage and in respective pairs of associated inner and outer ball tracks and held in a plane by the cage;
   wherein:
   tangential planes at the contact points of the balls with the inner ball tracks and the outer ball tracks form an angle of inclination;
   each of the inner ball tracks and each of the outer ball tracks has an active section in which the balls move;
   at least the active sections of the inner ball tracks exhibit a curvature that changes substantially continuously along the longitudinal axis of the inner hub;
   at least the active sections of the outer ball tracks exhibit a curvature that changes substantially continuously along the longitudinal axis of the outer hub, and
   the curvature of the active sections of the inner ball tracks and the curvature of the active sections of the outer ball tracks are configured and adapted to each other in such a way that the angle of inclination is substantially constant at least between a totally extended state of the joint and a maximally bent state of the joint,
   at least the active sections of the inner ball tracks are without a lateral offset and are in alignment with the longitudinal axis of the inner hub, and
   at least the active sections of the outer ball tracks each are without a lateral offset are in alignment with the longitudinal axis of the outer hub.

2. The joint as claimed in claim 1, wherein the inner ball tracks each substantially completely exhibit a curvature that changes substantially continuously along the associated longitudinal axis.

3. The joint as claimed in claim 1, wherein the outer ball tracks each substantially completely exhibit a curvature that changes substantially continuously along the associated longitudinal axis.

4. The joint as claimed in claim 1, wherein the inner ball tracks each extend substantially completely in a plane with the associated longitudinal axis.

5. The joint as claimed in claim 1, wherein the outer ball tracks each extend substantially completely in a plane with the associated longitudinal axis.

6. The joint as claimed in claim 1, wherein the curvature of the active sections of the inner ball tracks and the curvature of the active sections of the outer ball tracks correspond to the same mathematical function.

7. The joint as claimed in claim 1, wherein the curvature of at least the active sections of the inner ball tracks, or the curvature of at least the active sections of the outer ball tracks, or the curvatures of at least the active sections of the inner and outer ball tracks, can be described at least approximately by an at least sectionally elliptical mathematical function.

\* \* \* \* \*